United States Patent
Nuss

(10) Patent No.: US 6,979,376 B2
(45) Date of Patent: Dec. 27, 2005

(54) METHOD FOR MACHINING, SUCH AS SOLDERING OR DEFORMATION, A WORKPIECE

(75) Inventor: Lothar Nuss, Heusentamm (DE)

(73) Assignee: Stapla Ultraschalltechnik GmbH, Kelsterbach (DE)

( * ) Notice: Subject to any disclaimer, the term of this patent is extended or adjusted under 35 U.S.C. 154(b) by 0 days.

(21) Appl. No.: 10/477,748

(22) PCT Filed: May 31, 2002

(86) PCT No.: PCT/EP02/06019

§ 371 (c)(1),
(2), (4) Date: Jan. 28, 2004

(87) PCT Pub. No.: WO02/098636

PCT Pub. Date: Dec. 12, 2002

(65) Prior Publication Data

US 2004/0129366 A1    Jul. 8, 2004

(30) Foreign Application Priority Data

Jun. 1, 2001   (DE) ................ 101 26 943

(51) Int. Cl.[7] .............................. B32B 31/00
(52) U.S. Cl. ............... 156/64; 156/73.1; 264/445
(58) Field of Search ............ 156/69, 73.1, 73.5, 156/242, 308.2, 64, 359, 360, 362, 363, 378, 156/379, 580.1, 580.2; 137/15.18, 15.26, 137/587; 220/562; 264/442, 443, 444, 445

(56) References Cited

U.S. PATENT DOCUMENTS

| 5,435,863 | A | * | 7/1995 | Frantz ..................... 156/64 |
| 5,507,324 | A | * | 4/1996 | Whitley et al. .......... 141/59 |
| 5,601,205 | A | * | 2/1997 | Prechtel et al. ......... 220/562 |
| 5,658,408 | A | * | 8/1997 | Frantz et al. ............ 156/64 |
| 5,846,377 | A | * | 12/1998 | Frantz et al. ........... 156/359 |
| 5,855,706 | A | * | 1/1999 | Grewell .................. 156/64 |
| 5,939,166 | A |   | 8/1999 | Cheng et al. |
| 6,189,567 | B1 | * | 2/2001 | Foltz ..................... 137/587 |
| 6,260,578 | B1 | * | 7/2001 | Kuehnemund et al. ..... 137/592 |
| 6,422,261 | B1 | * | 7/2002 | DeCapua et al. ......... 137/202 |
| 6,460,591 | B1 | * | 10/2002 | Gotoh et al. ........... 156/359 |
| 6,484,741 | B2 | * | 11/2002 | Benjey et al. .......... 137/15.26 |

FOREIGN PATENT DOCUMENTS

| DE | 4321874 | 1/1995 |
| DE | 19810509 | 9/1999 |
| EP | 0567426 | 1/1997 |
| WO | 98/49009 | 11/1998 |

* cited by examiner

Primary Examiner—James Sells
(74) Attorney, Agent, or Firm—Dennison, Schultz, Dougherty & MacDonald

(57) ABSTRACT

A method for soldering or deforming a workpiece, according to which a sonotrode of supersonic welding device is placed on the workpiece to be machined and the oscillation amplitude of the sonotrode is modified. In order to optimize the soldering operation, the oscillation amplitude is reduced according to a pre-determined gradient during a predetermined time $t_x$, a characteristic parameter of the workpiece is measured directly or indirectly after time $t_x$, and the sonotrode transmits supersonic energy to the workpiece at a predefined constant or essentially constant amplitude during a period of time time $t_y$, according to the value of the measured parameter.

12 Claims, 1 Drawing Sheet

METHOD FOR MACHINING, SUCH AS SOLDERING OR DEFORMATION, A WORKPIECE

Figure 1:
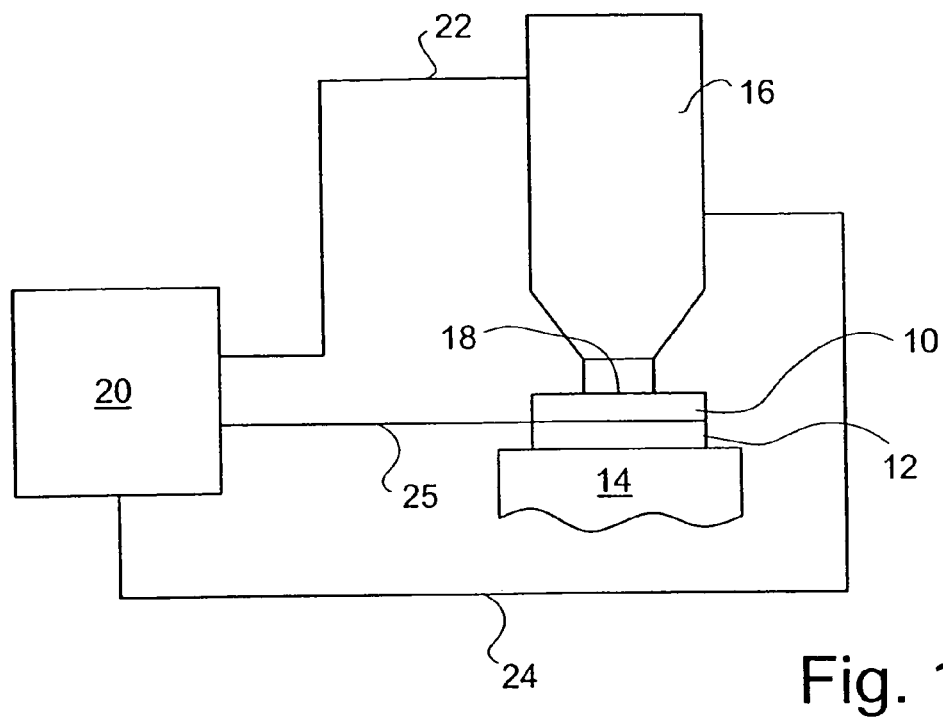

The invention concerns a method for processing, such as welding or shaping a work piece, especially consisting of plastic material or containing this, whereby a sonotrode or an ultrasound welding device is indirectly or directly braced upon the work piece for processing it for transmitting ultrasound energy, and whereby the sonotrode is altered in its vibration amplitude during processing.

A corresponding method is, for example, to be inferred from EP 0 567 426 B1. With known ultrasound welding methods, in which a sonotrode vibrates in resonance as a half wave length resonator and is brought into forced contact with a material and transmits ultrasound energy during a predetermined time interval to the work piece, the vibration amplitude of the sonotrode is reduced to a control signal in order thence to be operated at diminished vibration amplitude for the remainder of the predetermined time interval.

The control signal can moreover be triggered as a function of the output transmitted to the work piece. Corresponding methods are to be gathered from WO 98/49009, U.S. Pat. No. 5,855,706 or U.S. Pat. No. 5,658,408 or U.S. Pat. No. 5,435,863.

A choice can be made between the frequency of the ultrasound, the degree of deformation of the work piece or the softening conditions of the work piece can be selected as controlled variables in addition to the ultrasound energy transmitted. Due to the regulation, the automatic control engineering expenditure for realizing corresponding methods is quite expensive and therewith subject to disturbance.

The present invention is based on the problem of refining a method of the type mentioned at the beginning in such a way that an optimizing of the processing of work pieces, especially the welding of plastic parts, becomes possible through simple control, whereby even a self-learning optimizing of the method should be possible.

The problem is basically solved in accordance with the invention in that, during a specified time $t_x$, the vibration amplitude is reduced following a specified course. After time $t_x$, a characteristic parameter of the work piece is measured indirectly or directly. Subsequently, the sonotrode transfers ultrasound energy to the work piece over a time $t_y$ as a function of the value of the measured parameter at a specified constant vibration amplitude. Moreover, the vibration amplitude follows a ramp-like course in time $t_x$ that for its part is specified as a function of the work piece to be processed.

Deviating from the previously known state of the art, the sonotrode acts upon the work piece to be processed with firmly specified vibration amplitudes, whereby at the beginning of processing, the amplitude runs through specified values in order then to be set at a constant value. This value can be selected independently of the material or depending on the material.

Neither does any increase and subsequent reduction of the vibration amplitude take place in order to set a constant value. There is basically a continuous, but not necessarily constant, but rather a ramp-like reduction of the vibration amplitude during time $t_x$ from the beginning of welding or shaping taking place.

Independently of this, time $t_y$ within which the sonotrode acts upon the work piece with constant amplitude, is determined by reaching a characteristic value of the work piece to be processed, whereby, of course, a maximum time is not exceeded. This means that after a specified time $t_z$ the machining process is ended even when the work piece does not yet have the characteristics to be processed.

It is provided in a refinement of the invention that the course of the amplitude is verified for subsequent treatment processes and, if need be, altered as a function of the value of the parameter measured after time $t_x$. In this way, a self-learning process is realized which leads to optimal processing as well as welding results.

The sum of times $t_x$ and $t_y$ is different depending upon the material, but does not exceed the maximum time $t_z$, in order, for example, to avoid the ultrasound welding device from being damaged when errors occur.

It is in particular provided that during time $t_y$, in which the vibration amplitude is constant, the characteristic parameter or a further characteristic parameter of the work piece to be processed is measured indirectly or directly, and processing is terminated after reaching a specified value of the parameter.

The temperature of the work piece and/or the degree of shaping of the work piece and/or the travel of the sonotrode during processing and/or light transmission of the work piece and/or light reflection of the work piece can be selected as parameters. Moreover, the degree of deformation of the work piece can be determined by a displacement sensor allocated to the sonotrode so that an indirect parameter determination takes place as a consequence of this.

Time $t_x$, within which amplitudes of the sonotrode follow a specified course, can be specified according to material-specific values of the work piece to be processed stored in the ultrasound welding device. Moreover the stored values can be automatically called up when feeding the work piece. It is in particular provided that the stored values are called up by reading the coding allocated to the work piece.

Figure 2:
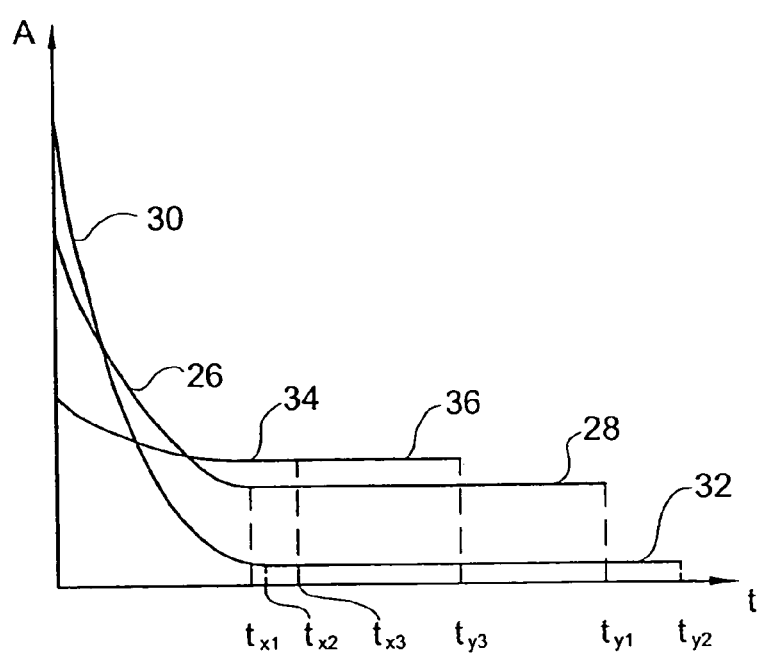

Further details, advantages and features of the invention become apparent not only from the claims, the features to be inferred from these—by themselves or in combination—but also from the following description of preferred designs to be gathered from the drawings, wherein:

FIG. 1 Provides a basic representation of an arrangement for ultrasound welding of plastic materials and FIG. 2 Provides an amplitude-time diagram.

An arrangement for processing a work piece is basically represented in FIG. 1. In particular, a part or several parts are understood by work piece, which are made of plastic or contain plastic and are to be welded with one another. Other applications, for example separating plastic parts, are likewise possible. The medical area is here to be mentioned as a preferred area of application of the plastic welding.

In the design, two plastic parts 10, 12 which are positioned on a counter-electrode or an anvil 14 are to be welded using an ultrasound welding device, and to be sure through a sonotrode 16 set into vibration which comes into contact with the parts 10, 12 to be welded with its sonotrode head 18 and indeed with the upper part 14. The sonotrode 16 set into vibration in a usual manner through a converter and if need be a booster, without this being explained in greater detail. The energy supply to the converter takes place from a control unit 20 through a line 22 through which the vibration amplitude and vibration duration are also set.

It is provided in accordance with the invention that during a first time $t_x$, the sonotrode 16 is altered in its vibration amplitude and therewith in energy supply to the parts 10, 12 to be welded, and to be sure reduced, whereby a continuous or step by step amplitude diminution can take place. After a firmly specified time $t_x$, a characteristic magnitude of the parts 10, 12 to be welded, such as, for example, temperature, is used in order then to set the sonotrode 16 to a constant vibration amplitude through the control unit 20. The sonotrode 16 then vibrates with this firmly specified amplitude over a period of time $t_y$ which is either firmly specified or is determined as a function of the progress of the welding. Once again a parameter of the parts 10, 12 to be welded can be used for this as a switching variable to terminate the ultrasound welding.

Two possibilities for measuring a parameter are represented in the design purely by way of example. Thus a control signal can be supplied to the control unit 20 over a line 24 through a displacement sensor allocated to a sonotrode 16. The displacement sensor indirectly provides information on the degree of deformation or softening of the parts 10, 12 to be welded.

The temperature of the parts 10, 12 to be welded can be measured at the same time or alternatively through a measuring probe (not represented) and a line 25 and fed to the control unit 20 to specify the constant amplitude during time $t_x$ or time duration $t_y$.

The amplitude of a sonotrode is represented in relation to time t in FIG. 2 through which the ultrasound energy is transmitted to a work piece to be processed or to be welded. Thus curve 26 represents a ramp-like, thus basically a constantly changing or a changing step by step, that is a diminishing course of an amplitude change for a first work piece over a firmly specified time duration $t_{x1}$. After time $t_{x1}$, a characteristic parameter of the work piece to be processed, such as temperature, softening or translucence is measured on the amorphous thermoplastic to be processed.

The sonotrode is then set at an amplitude of constant magnitude (straight line 28) as a function of the measured value. During the action of the sonotrode with the amplitude corresponding to straight line 28, the same or another parameter of the work piece to be processed can be measured at certain time intervals or continuously in order to remove the sonotrode from the work piece if the processed work piece has reached a specified quality on the basis of the value ascertained or it is recognizable that a welding process is ended, terminating the treatment process after a time $t_y$.

Curves 30, 32 correspond to the processing of a work piece of other material properties. One will recognize that the ramp-like amplitude corresponding to curve 30 course runs steeper than curve 26. At the same time, time $t_{x2}$, after which the amplitude change is concluded, is greater than time $t_{x2}$. Then the amplitude is set to a value that is smaller than in the preceding example. The treatment process itself is ended after a time $t_{x2}$ which is greater than time $t_{x1}$.

A further course sequence represented by curves 34, 36 makes it clear that the ramp-like change in course of the amplitude runs flatter in contrast to which then subsequent constant amplitude value (curve 34) is greater than in the preceding examples with a simultaneously smaller time $t_{y3}$.

The amplitude course changes 26, 30, 34 are material-dependent and are basically stored in the ultrasound welding device. Nonetheless an independent optimizing of the specified curves can moreover take place in that, after ending the processing, thus after time $t_{x1}$, $t_{x2}$, $t_{x3}$, measuring results obtained are compared with those specified in order to enable a subsequent control if need be.

Apart from this, the overall time $t_x+t_y$ is smaller than a maximum time $t_z$ even if the material to be processed still does not yet have the desired properties at time $t_x$ on the basis of the measured parameter or parameters. In this way, it is assured that any potential errors cannot lead to a destruction of the ultrasound welding device or parts.

Furthermore, it should be noted that the theory of the invention can be used for the welding of plastics in the near field as well as in the far field.

With regard to the thermoplastics to be welded, such as amorphous or partially crystalline thermoplastics, it should be noted that only such with similar softening ranges should be welded or glued. Due to its polarity, ultrasound welding is especially suited for PVC, which also serves as an additive in ultrasound welding of PMMA and ABS.

What is claimed is:

1. Method for treating a thermoplastic-containing work piece with ultrasonic energy, in which the work piece is disposed between a support and a sonotrode generating the ultrasonic energy of a controlled amplitude, comprising the steps of:
   continuously reducing the amplitude from a maximum value to a predetermined value over a specified initial time period $t_x$ in a specified course,
   directly or indirectly measuring a characteristic parameter of the work piece after time $t_x$, and
   maintaining the amplitude substantially constant at the predetermined value for a time $t_y$ to conclude the method for treating.

2. Method according to claim 1, wherein the amplitude is reduced following a ramp-like course.

3. Method according to claim 1, wherein the course of amplitude change is specified as a function of the work piece to be processed.

4. Method according to claim 1, wherein the amplitude course of a subsequently to be processed work piece is checked and if need be altered as a function of the value measured after time $t_x$.

5. Method according to claim 1, wherein time $t_y$ is variable.

6. Method according to claim 1, wherein $t_x+t_y$ is smaller than or equal to a specified time interval $t_z$.

7. Method according to claim 1, wherein during time $t_y$, the characteristic parameter or a further characteristic parameter of the work piece to be processed is indirectly or directly measured, and the processing is ended after reaching a specified value of the parameter.

8. Method according to claim 1, wherein the parameter is at least one of temperature of the work piece, degree of deformity of the work piece, travel of the sonotrode during processing, transmission of the work piece and light reflection of the work piece.

9. Method according to claim 1, wherein time $t_x$ and the course of the changing amplitudes are specified according to material-specified values of the work piece to be processed stored in the ultrasound welding device.

10. Method according to claim 9, wherein the stored values are automatically called up when the work piece is fed to the ultrasound welding device.

11. Method according to claim 10, wherein the calling up is conducted by reading coding of the stored values allocated to the work piece.

12. Method according to claim 1, wherein the method is welding or shaping.

* * * * *